(12) United States Patent
Hasegawa et al.

(10) Patent No.: US 7,673,618 B2
(45) Date of Patent: Mar. 9, 2010

(54) CONTROL SYSTEM FOR INTERNAL COMBUSTION ENGINE

(75) Inventors: Mamoru Hasegawa, Saitama-ken (JP); Satoshi Yamaguchi, Saitama-ken (JP); Hideki Sakamoto, Saitama-ken (JP); Naoto Kitayama, Saitama-ken (JP); Tatsuo Yamanaka, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 11/898,275

(22) Filed: Sep. 11, 2007

(65) Prior Publication Data

US 2008/0262699 A1  Oct. 23, 2008

(30) Foreign Application Priority Data

Sep. 11, 2006 (JP) .............................. 2006-245196
Nov. 14, 2006 (JP) .............................. 2006-308151

(51) Int. Cl.
*G01N 33/22* (2006.01)
*G01M 15/08* (2006.01)

(52) U.S. Cl. ............... 123/435; 123/568.12; 123/406.3; 123/406.41; 701/108; 73/35.02

(58) Field of Classification Search ................. 123/435, 123/568.12, 406.3, 406.41; 701/108; 73/35.02
See application file for complete search history.

(56) References Cited

U.S. PATENT DOCUMENTS 3,750,635 A * 8/1973 Hoffman et al. ............ 123/357
4,920,494 A * 4/1990 Abo et al. ................... 701/104
5,586,537 A * 12/1996 Tomisawa et al. ........... 123/435
5,711,272 A * 1/1998 Maegawa et al. ...... 123/406.53
6,079,396 A * 6/2000 Ament et al. ............... 123/674
7,050,901 B2 * 5/2006 Yasuda et al. ............... 701/113
7,246,596 B2 * 7/2007 Yamaguchi et al. ......... 123/299
7,367,223 B2 * 5/2008 Kettl et al. .................. 73/53.05
7,480,557 B2 * 1/2009 Yamaguchi et al. ......... 701/104
7,487,663 B2 * 2/2009 Sobotowski et al. ........ 73/35.02
7,599,781 B2 * 10/2009 Yamaguchi et al. ......... 701/103
2003/0200955 A1 * 10/2003 zur Loye et al. ............ 123/435
2005/0247285 A1 * 11/2005 Nagai et al. ................ 123/305

FOREIGN PATENT DOCUMENTS

| JP | 2005-048703 A | 2/2005 |
| JP | 2005-061239 A | 3/2005 |
| JP | 2005-344550 A | 12/2005 |
| JP | 2006-226188 A | 8/2006 |

* cited by examiner

*Primary Examiner*—Erick Solis
(74) *Attorney, Agent, or Firm*—Arent Fox LLP.

(57) ABSTRACT

A control system for an internal combustion engine, which is capable of estimating a property of fuel accurately even when the engine is in an operating condition other than idling. An in-cylinder pressure sensor detects an amount of change in pressure in a cylinder #1 of the engine as a pressure change amount. An ECU calculates an amount of heat released in the cylinder #1 as a heat release amount, according to the pressure change amount. A vehicle speed sensor, a crank angle sensor, and an accelerator pedal opening sensor detect load on the engine. The ECU estimates a cetane number of fuel based on the calculated heat release amount and the detected load on the engine.

8 Claims, 15 Drawing Sheets

F I G. 5
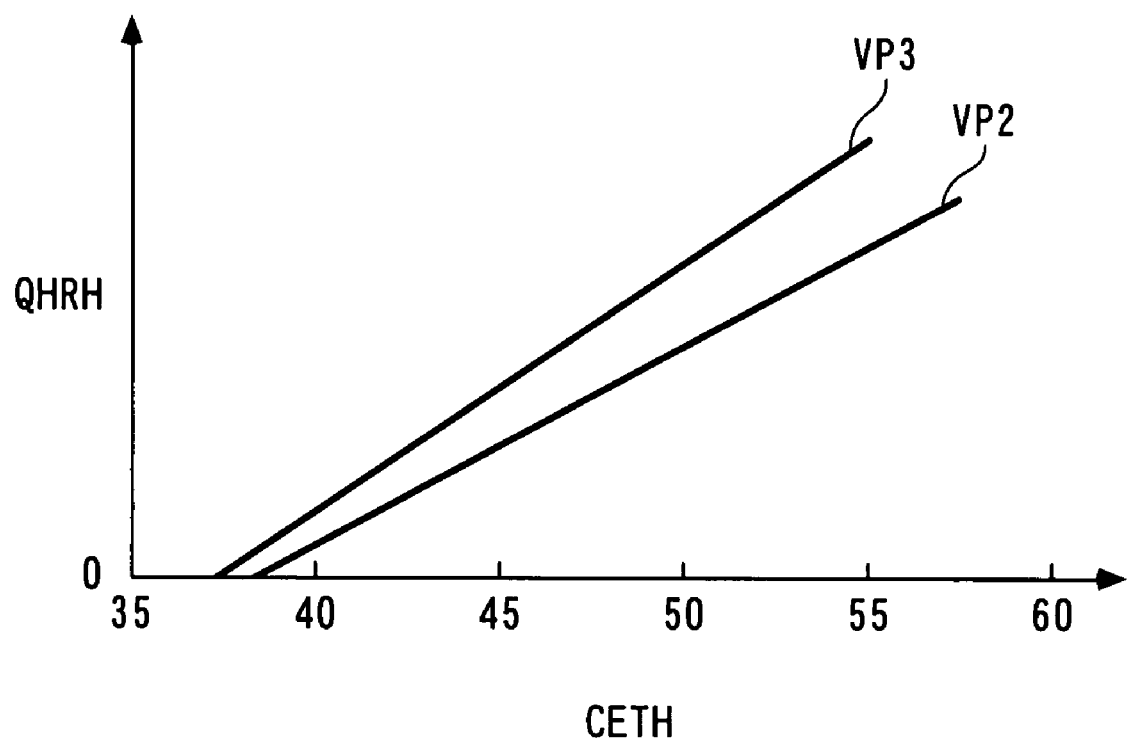

F I G. 1 5

(a) CET 1

| PMCMD<br>NE | PMCMD1 | ·········· | PMCMDj |
|---|---|---|---|
| NE1 | QHRDREF111 | ·········· | QHRDREF11j |
| ⋮ | ⋮ | | ⋮ |
| NEi | QHRDREF1i1 | ·········· | QHRDREF1ij |

(b) CET 2

| PMCMD<br>NE | PMCMD1 | ·········· | PMCMDj |
|---|---|---|---|
| NE1 | QHRDREF211 | ·········· | QHRDREF21j |
| ⋮ | ⋮ | | ⋮ |
| NEi | QHRDREF2i1 | ·········· | QHRDREF2ij |

(c) CET 3

| PMCMD<br>NE | PMCMD1 | ·········· | PMCMDj |
|---|---|---|---|
| NE1 | QHRDREF311 | ·········· | QHRDREF31j |
| ⋮ | ⋮ | | ⋮ |
| NEi | QHRDREF3i1 | ·········· | QHRDREF3ij |

CONTROL SYSTEM FOR INTERNAL COMBUSTION ENGINE

BACKGROUND OF THE INVENTION

1. Field of the Invention

This invention relates to a control system for an internal combustion engine.

2. Description of the Related Art

Conventionally, there has been proposed a control system of this kind e.g. in Japanese Laid-Open Patent Publication (Kokai) No. 2005-344550. This control system is applied to a diesel engine for an automotive vehicle, and when the engine is idling, the control system estimates a cetane number of fuel during execution of a pilot injection and a main injection. The estimation of the cetane number is carried out, based on a heat release amount parameter calculated according to pressure in a combustion chamber detected by an in-cylinder pressure sensor and the volume of the combustion chamber calculated from a detection value of the crank angle sensor, in the following manner:

First, by controlling the amount of fuel injected by pilot injection, the difference between the maximum value and the minimum value of the heat release amount parameter assumed during a time period until main injection is adjusted to a predetermined amount. Next, the main injection is carried out under predetermined conditions, and a rate of rise in the heat release amount parameter calculated during a predetermined crank angle section from a time point at which the heat release amount parameter started to rise by the main injection is calculated a plurality of times. An estimated value of the cetane number is calculated according to the average of a plurality of calculated values of the rate of rise in the heat release amount.

In the above-mentioned control system, the cetane number is calculated based on the heat release amount parameter calculated according to the pressure in the combustion chamber. However, in engine operating conditions other than idling, the pressure in the combustion chamber varies depending on load on the engine etc., and the heat release amount parameter also varies accordingly. As a consequence, the estimated value of the cetane number deviates from a proper value, which makes is impossible to estimate the cetane number with accuracy.

To overcome the problem, assuming that the estimation of the cetane number is carried out only during idling of the engine, if the vehicle is started almost without executing idling immediately after refueling, the cetane number cannot be estimated until idling of the engine is executed next time. Therefore, if the cetane number of replenished fuel is different from fuel used before refueling, the control of the engine is carried out based on an estimated value of the cetane number different from the actual cetane number. As a consequence, actual ignition timing of fuel varies to increase noise and vibrations, or increase exhaust emissions.

SUMMARY OF THE INVENTION

The present invention has been made in view of the above problems, and an object of the invention is to provide a control system for an internal combustion engine, which is capable of estimating a property of fuel accurately even when the engine is in an operating condition other than idling.

To attain the above object, in a first aspect of the present invention, there is provided a control system for an internal combustion engine, comprising pressure change amount-detecting means for detecting an amount of change in pressure within a cylinder of the engine as a pressure change amount, heat release amount-calculating means for calculating an amount of heat released in the cylinder as a heat release amount, according to the detected pressure change amount, load detecting means for detecting load on the engine, and fuel property-estimating means for estimating a property of fuel, based on the calculated heat release amount and the detected load on the engine.

With the configuration of the control system according to the first aspect of the present invention, the pressure change amount-detecting means detects an amount of change in pressure within a cylinder of the engine as a pressure change amount. The heat release amount-calculating means calculates an amount of heat released in the cylinder as a heat release amount, according to the detected pressure change amount. The fuel property-estimating means estimates a property of fuel, based on the calculated heat release amount and the load on the engine detected by the load detecting means.

In general, the ignitability of fuel varies according to properties thereof, and for example, as the cetane number of fuel is higher, the fuel is easier to burn, and hence the amount of heat released within a predetermined time period immediately after ignition and the amount of change in pressure occurring in the cylinder are larger. On the other hand, as the cetane number of fuel is lower, the amount of heat released within a predetermined time period immediately after ignition and the amount of change in pressure occurring in the cylinder are both smaller. Therefore, the amount of heat release which is detected according to the amount of change in the pressure excellently reflects a property of fuel.

Further, the heat release amount varies depending on load on the engine. Therefore, by estimating the property of fuel based not only on the heat release amount but also on the load on the engine, the property of fuel can be accurately estimated, whereby it is possible to accurately estimate the property of fuel even when the engine is in an operating condition other than idling.

Preferably, the control system further comprises exhaust gas-recirculating means for recirculating part of exhaust gases exhausted from the cylinder to the cylinder, and exhaust gas recirculation amount-reducing means for reducing an amount of exhaust gases recirculated to the cylinder, according to the load on the engine, when the fuel property-estimating means estimates the property of fuel.

With the configuration of this preferred embodiment, when the fuel property-estimating means estimates the property of fuel, the exhaust gas recirculation amount-reducing means reduces the amount of exhaust gases recirculated to a plurality of cylinders (hereinafter referred to as "the EGR gas amount" according to the load on the engine. If the EGR gas amount is reduced, a proportion of fresh air in intake air drawn into the cylinder increases, which increases both the amount of heat release caused by combustion within a predetermined time period and the amount of change in pressure. Therefore, by reducing the amount of recirculated exhaust gases depending on load on the engine, for example, when the load is low and the heat release amount is small, the heat release amount is increased, whereby the difference in heat release amount due to the difference in property of fuel becomes larger, which makes it possible to estimate the property of fuel based on the heat release amount more accurately.

Preferably, the control system further comprises heat release amount-storing means for storing amounts of heat released by combustion of fuels having respective predetermined properties different from each other, on a predetermined property-by-predetermined property basis, according to the load on the engine, as reference heat release amounts, in advance, and the fuel property-estimating means estimates the property of fuel based on the reference heat release amounts associated with the respective predetermined properties retrieved from the heat release amount-storing means according to the detected load on the engine, and the heat release amount calculated by the heat release amount-calculating means.

With this configuration of the preferred embodiment, the heat release amount-storing means stores amounts of heat released by combustion of fuels having respective predetermined properties different from each other, on a predetermined property-by-predetermined property basis, according to the load on the engine, as reference heat release amounts, in advance. Out of these reference heat release amounts, reference heat release amounts corresponding to the detected load on the engine are retrieved in association with the respective predetermined properties, and the property of fuel in use is estimated based on the retrieved reference heat release amounts associated with the respective predetermined properties, and the heat release amount calculated according to the detected pressure change amount.

As described above, the heat release amount varies depending on the load on the engine, and the heat release amount calculated according to the pressure change amount excellently reflects the property of fuel. Therefore, by setting and storing the reference heat release amounts such that correlation between load on the engine and the property of fuel is properly reflected thereon, it is possible to more accurately estimate the property of fuel in use from the reference heat release amounts determined according to the detected actual load and the heat release amount calculated according to the detected actual pressure change amount, when the engine is in an arbitrary operating condition.

More preferably, the fuel property-estimating means has provisional determination means for provisionally determining the property of fuel according to the retrieved reference heat release amounts associated with the respective predetermined properties and the calculated heat release amount, and estimates the property of fuel by subjecting the provisionally determined property of fuel to a filtering process.

With this configuration of the preferred embodiment, the property of fuel is provisionally determined based on the retrieved reference heat release amounts retrieved according to the detected load in association with the respective predetermined properties and the heat release amount calculated according to the pressure change amount, and the provisionally determined property of fuel is subjected to a filtering process, whereby the property of fuel in use is estimated.

In general, the detection values of sensors detecting load on the engine and the pressure change amount contain noise due to a disturbance and an unstable combustion, and hence if the property of fuel is directly estimated according to the detected load and pressure change amount, there tends to occur variation in the estimated property of fuel. In contrast, according to the preferred embodiment, influence caused by noise can be suppressed by subjecting the property of fuel provisionally determined according to the detected load and pressure change amount to a filtering process, and hence the property of fuel can be accurately estimated.

More preferably, the fuel property-estimating means subjects the detected load on the engine to a filtering process, and retrieves the reference heat release amounts according to the load on the engine subjected to the filtering process.

With this configuration of the preferred embodiment, the detected load on the engine is subjected to a filtering process, and the reference heat release amounts are retrieved according to the load on the engine subjected to the filtering process. Thus, the influence of noise contained in the detected load is suppressed, so that the reference heat release amounts retrieved according to the load are made more stable, and hence the property of fuel can be estimated based on the reference heat release amounts in a more stable manner.

Further preferably, the load detecting means detects a plurality of kinds of loads different from each other, and the fuel property-estimating means subjects the detected different kinds of loads to respective filtering processes having the same filter characteristic.

With this configuration of the preferred embodiment, according to the detected different kinds of loads, the reference heat release amounts are retrieved on a fuel property-by-fuel property basis. Since the reference heat release amounts are thus retrieved according to the different kinds of loads, more appropriate reference heat release amounts can be retrieved than when the same are retrieved according to a single kind of load, so that the reliability of the property of fuel estimated based on the reference heat release amounts can be further improved.

Further, the detected plurality of kinds of loads different from each other are subjected to the respective filtering processes having the same filter characteristic, and hence influence e.g. of noise on any kind of load can be controlled to the same degree, whereby the reference heat release amounts which are retrieved according to these loads subjected to the filtering processes can be appropriately calculated, so that the reliability of the property of fuel estimated based on the reference heat release amounts can be further improved.

To attain the above object, in a second aspect of the present invention, there is provided a control system for an internal combustion engine, comprising pressure change amount-detecting means for detecting an amount of change in pressure within a cylinder of the engine as a pressure change amount, heat release amount-calculating means for calculating an amount of heat released in the cylinder as a heat release amount, according to the detected pressure change amount, load detecting means for detecting load on the engine, and cetane number-estimating means for estimating a cetane number of fuel, based on the calculated heat release amount and the detected load on the engine.

With the configuration of the control system according to the second aspect of the present invention, similarly to the control system according to the first aspect of the present invention, the cetane number of fuel is estimated based on the heat release amount calculated according to the detected amount of change in pressure within the cylinder and load on the engine. Therefore, the cetane number of fuel as a property of fuel can be accurately estimated even when the engine is in an operating condition other than idling. Further, using the cetane number thus accurately estimated, it is possible to properly control e.g. the fuel injection amount and fuel injection timing.

Further, to attain the above object, in a third aspect of the present invention, there is provided a control system for an internal combustion engine that sequentially performs a pilot injection and a main injection to thereby inject fuel into a cylinder, comprising pressure change amount-detecting means for detecting an amount of change in pressure within a cylinder of the engine caused by combustion of fuel injected by the pilot injection, as a pressure change amount, heat release amount-calculating means for calculating an amount of heat released in the cylinder as a heat release amount, according to the detected pressure change amount, load detecting means for detecting load on the engine, and fuel property-estimating means for estimating a property of fuel, based on the calculated heat release amount and the detected load on the engine.

With the configuration of the control system according to the third aspect of the present invention, a pilot injection and a main injection are sequentially performed as injection of fuel into a cylinder, and the amount of change in pressure in the cylinder caused by combustion of fuel injected by the pilot injection is detected as the pressure change amount. Then, based on the heat release amount calculated according to the pressure change amount and the load on the engine, the property of fuel is estimated.

The pilot injection is often carried out with a view to suppressing sudden ignition by the main injection and improving ignitability of the main injection at cold times. Therefore, it is possible to accurately determine whether the ignitability of fuel is good or poor, using the amount of heat release caused by the pilot injection as a parameter, and hence properties of fuel including the cetane number indicative of ignitability can be more accurately determined.

The above and other objects, features, and advantages of the invention will become more apparent from the following detailed description taken in conjunction with the accompanying drawings.

BRIEF DESCRIPTION OF THE DRAWINGS

FIG. 5 is a diagram showing an example of a CETH table for use in the FIG. 3 process;

FIG. 15 is a diagram showing three heat release amount maps associated with first to third cetane numbers, respectively;

DETAILED DESCRIPTION OF THE PREFERRED EMBODIMENTS

Figure 1:
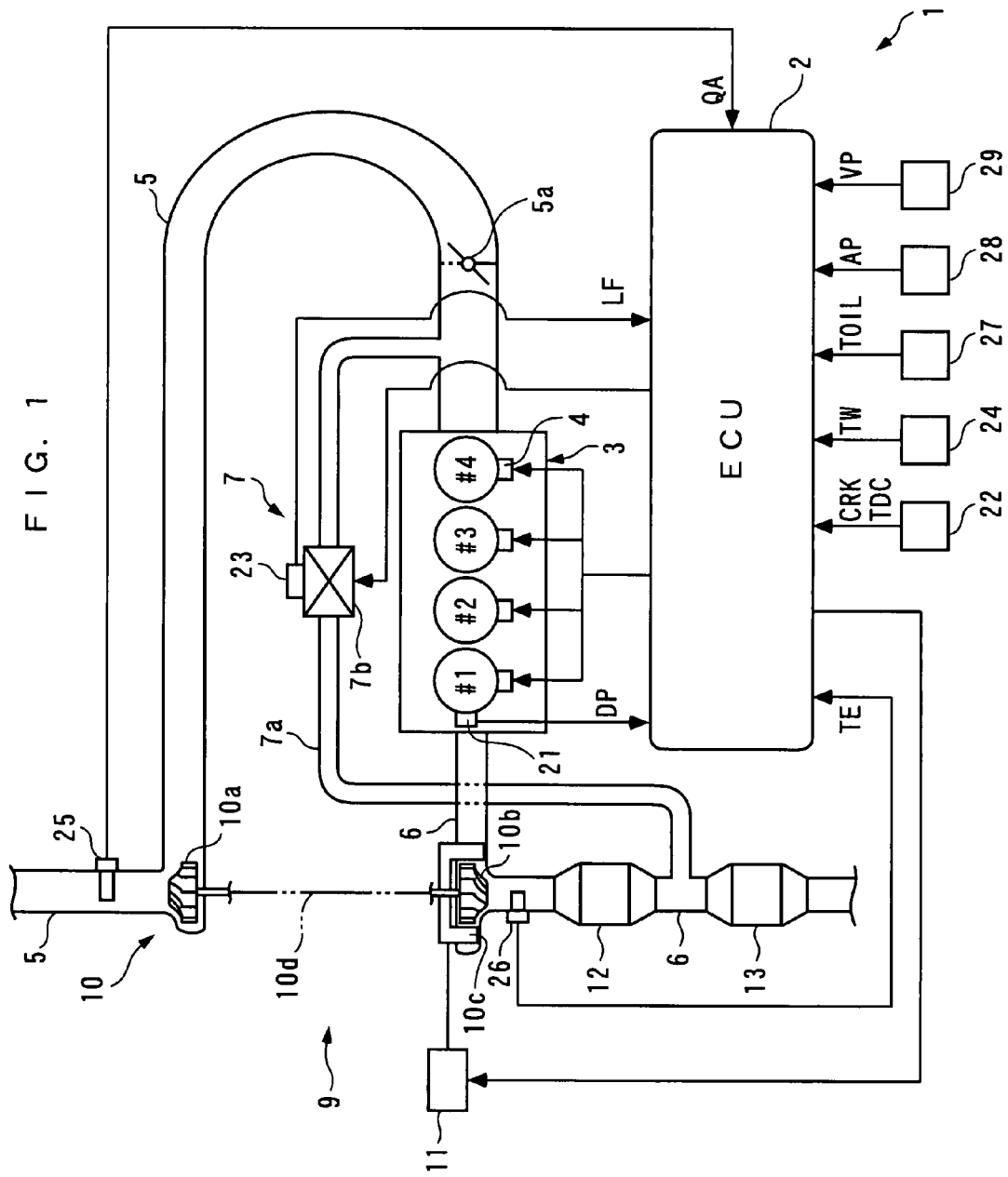
FIG. 1 is a schematic diagram of a control system according to an embodiment of the present invention and an internal combustion engine to which the control system is applied.

The invention will now be described in detail with reference to the drawings showing preferred embodiments thereof. FIG. 1 shows a control system 1 to which the present invention is applied, together with an internal combustion engine (hereinafter referred to as "the engine") 3. The engine 3 is an in-line four-cylinder diesel engine having first to fourth cylinders #1 to #4, and is installed on a vehicle (not shown). Normally, in the engine 3, normal combustion is executed in which there are sequentially performed pilot injection for injecting fuel during a desired time period from a time point in the intake stroke to a time point in the compression stroke, and main injection for injecting fuel during the compression stroke.

Each of the cylinders #1 to #4 is provided with a fuel injection valve (hereinafter referred to as "the injector") 4. A fuel injection amount QINJ and fuel injection timing TINJ associated with each injector 4 are controlled by an injection pulse signal SINJ from an ECU 2.

An in-cylinder pressure sensor 21 is inserted in the cylinder #1. The in-cylinder pressure sensor 21 is implemented by a piezoelectric element and is integrally formed with a glow plug (not shown). The in-cylinder pressure sensor 21 senses an amount of change in pressure within the cylinder #1 (hereinafter referred to as "the in-cylinder pressure change amount DP") and delivers a signal indicative of the sensed in-cylinder pressure change amount DP to the ECU 2.

A magnet rotor (not shown) is mounted on a crankshaft (not shown) of the engine 3. The magnet rotor and an MRE pickup (not shown) form a crank angle sensor 22 that delivers a CRK signal and a TDC signal, which are both pulse signals, to the ECU 2 in accordance with rotation of the crankshaft.

Each pulse of the CRK signal is generated whenever the crankshaft rotates through a predetermined crank angle (e.g. 1°). The ECU 2 calculates rotational speed NE of the engine 3 (hereinafter referred to as "the engine speed NE") based on the CRK signal. The TDC signal indicates that a piston (not shown) of each cylinder is at a predetermined crank angle position in the vicinity of the top dead center (TDC) at the start of the intake stroke thereof. Further, the engine 3 is provided with a cylinder-discriminating sensor (not shown). The cylinder-discriminating sensor generates a pulse signal for use in discriminating each of the four cylinders #1 to #4 from the others, and delivers the signal to the ECU 2.

Further, the engine 3 is provided with an EGR system 7 comprised of an EGR pipe 7a and an EGR control valve 7b. The EGR pipe 7a extends to connect between a portion of an intake pipe 5 and a portion of an exhaust pipe 6. Part of exhaust gases emitted from the engine 3 are recirculated as EGR gases to the intake pipe 5 via the EGR pipe 7a and then flow into the cylinders #1 to #4. As a consequence, a combustion temperature within the engine 3 is lowered, whereby NOx contained in the exhaust gases is reduced.

The EGR control valve 7b is comprised of a butterfly valve (not shown) disposed in the EGR pipe 7a and a DC motor (not shown) for actuating the butterfly valve. An electric current supplied to the DC motor is controlled by the ECU 2 to linearly control the degree of opening of the butterfly valve, whereby the amount of EGR gases (hereinafter referred to as "the EGR amount") is controlled. The opening degree LF of the EGR control valve 7b (hereinafter referred to as "the EGR valve opening LF") is sensed by an EGR valve opening sensor 23, and a signal indicative of the sensed EGR valve opening is delivered to the ECU 2.

Further, the intake pipe 5 of the engine 3 is provided with a supercharging system 9. The supercharging system 9 is comprised of a turbo charger-type supercharger 10, and a vane actuator 11 connected to the supercharger 10. The supercharger 10 includes a compressor blade 10a rotatably provided in the intake pipe 5 at a location upstream of a throttle valve 5a, a turbine blade 10b and a plurality of rotatable variable vanes 10c (only two of which are shown) provided in intermediate portions of the exhaust pipe 6, and a shaft 10d integrally formed with these blades 10a and 10b to connect them. When the turbine blade 10b is driven for rotation by exhaust gases flowing through the exhaust pipe 6, a supercharging operation is performed. The vane actuator 11 is controlled by a control signal from the ECU 2, whereby the opening of each variable vane 10c is changed to control boost pressure.

An oxidation catalyst 12 and a DPF 13 are arranged from upstream to downstream in the mentioned order at respective locations downstream of the supercharger 10 in the exhaust pipe 6. The oxidation catalyst 12 oxidizes HC and CO in exhaust gases to reduce exhaust emissions. The DPF 13 collects particulate matter (hereinafter simply referred to as "PM"), such as soot, from exhaust gases to thereby reduce the amount of PM emitted into the air. Further, the DPF 13 carries the same type of oxidation catalyst (not shown) as the oxidation catalyst 12, on a surface thereof.

When exhaust gases pass through fine holes in a filter of the DPF 13, the DPF 13 collects soot which is PM contained in exhaust gases and mainly composed of carbon, by causing the soot to be deposited on the surface of a filter wall and in the holes inside the filter wall. The filter wall is formed e.g. of ceramics, such as silicon carbide, or a porous metal body.

When soot is deposited to a limit of the soot collecting capability of the DPF 13, this causes a rise in the exhaust pressure, and therefore, a regeneration process is carried out for the DPF 13 by burning the soot in appropriate timing. The generation process is executed e.g. by post injection in which fuel is injected into the combustion chamber (not shown) during the expansion stroke or the exhaust stroke of the engine 3. This supplies unburned fuel to exhaust gases and by holding the DPF 13 at high temperature (e.g. 600° C.), the soot deposited on the filter is burned, whereby the DPF 13 is regenerated to secure proper flow of gases through the exhaust pipe 6.

An engine coolant temperature sensor 24 is mounted in the cylinder block of the engine 3. The engine coolant temperature sensor 24 senses a temperature TW of engine coolant circulating through the cylinder block (not shown) of the engine 3 (hereinafter referred to as "the engine coolant temperature TW"), and delivers a signal indicative of the sensed engine coolant temperature TW to the ECU 2.

An air flow sensor 25 and an exhaust temperature sensor 26 are inserted into the intake pipe 5 and the exhaust pipe 6, respectively. The air flow sensor 25 senses an intake air amount QA and delivers a signal indicative of the sensed intake air amount QA to the ECU 2, while the exhaust temperature sensor 26 senses an exhaust temperature TE and delivers a signal indicative of the sensed exhaust temperature TE to the ECU 2.

Further, an oil temperature sensor 27, an accelerator pedal opening sensor 28, and a vehicle speed sensor 29 deliver signals to the ECU 2, which are respectively indicative of temperature of lubricating oil in the engine 3 (hereinafter referred to as "the oil temperature") TOIL, a stepped-on amount of an accelerator pedal (not shown) of the vehicle (hereinafter referred to as "the accelerator pedal opening") AP, and a vehicle speed VP.

In the present embodiment, the ECU 2 implements heat release amount-calculating means, and fuel property estimating means, and is formed by a microcomputer comprised of an I/O interface, a CPU, a RAM, and a ROM. The ECU 2 executes control processes for the engine 3, including a cetane number (CET)-calculating process for calculating a cetane number CET, described below, based on the signals from the aforementioned sensors 21 to 29, according to control programs stored in the ROM and the like.

Figure 2:
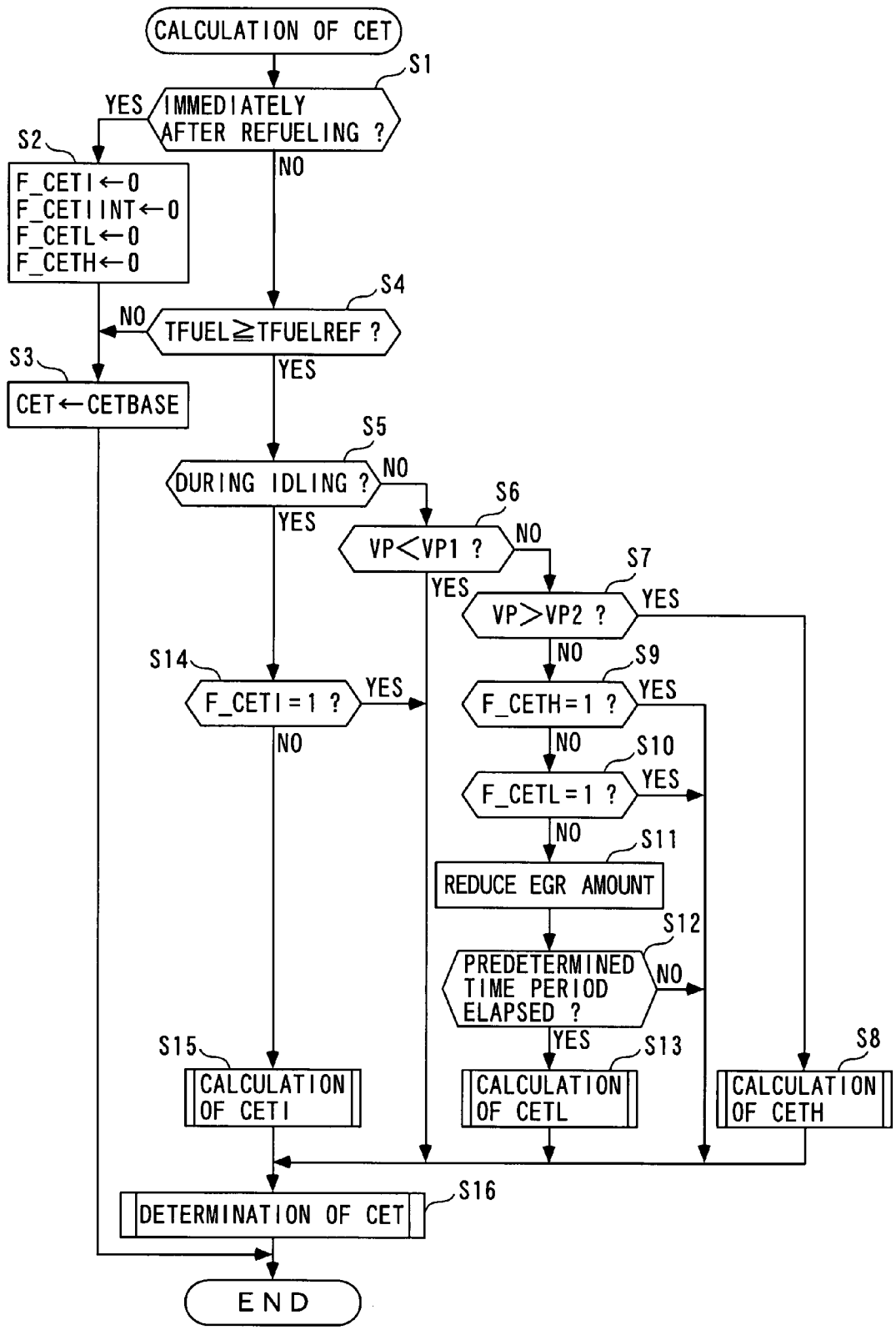
FIG. 2 is a flowchart showing a cetane number (CET)-calculating process executed by the control system according to the first embodiment.

FIG. 2 shows the CET-calculating process according to the present embodiment. In the present process, the cetane number of fuel is calculated as a property of fuel. The CET-calculating process is executed at predetermined time intervals. First, in a step 1 (shown as S1 in abbreviated form in FIG. 2; the following steps are also shown in abbreviated form), it is determined whether or not it is immediately after refueling. If the answer to the question is affirmative (YES), an idle-time cetane number calculation completion flag F_CETI, an idle-time cetane number provisional calculation flag F_CETIINT, a low load-time cetane number calculation completion flag F_CETL, and a medium/high load-time cetane number calculation completion flag F_CETH are all reset to 0 (step 2).

Next, the cetane number CET is set to a predetermined provisional cetane number CETBASE (e.g. 45) in a step 3, followed by terminating the present process. This causes the engine 3 to be controlled according to the provisional cetane number CETBASE, immediately after refueling.

On the other hand, if the answer to the question of the step 1 is negative (NO), it is determined whether an operation time TFUEL of the engine 3 after refueling is not shorter than a predetermined time period TFUELREF (step 4). If the answer to the question is negative (NO), it is judged that the operation time of the engine 3 after refueling is short, and hence there is a possibility that fuel remaining e.g. in a pipe between a fuel tank and the engine 3 has not been fully replaced by the refueled fuel, and the step 3 is carried out without calculating the cetane number CET, followed by terminating the present process.

If the answer to the question of the step 4 is affirmative (YES), it is determined whether or not the engine 3 is idling (step 5). In this step, when the vehicle speed VP and the accelerator pedal opening AP are both equal to approximately 0, it is determined that the engine 3 is idling. If the answer to the question of the step 5 is negative (NO), it is determined whether or not the vehicle speed VP is lower than a first predetermined vehicle speed VP1 (e.g. 60 km/h) (step 6). If the answer to the question is affirmative (YES), i.e. if VP<VP1 holds, a step 16, described hereinafter, is executed without calculating the cetane number CET, followed by terminating the present process.

On the other hand, if the answer to the question of the step 6 is negative (NO), it is determined whether or not the vehicle speed VP is higher than a second predetermined vehicle speed VP2 (e.g. 80 km/h) which is higher than the first predetermined vehicle speed VP1 (step 7). If the answer to the question is affirmative (YES), i.e. VP>VP2 holds, it is judged that the engine 3 is in a medium/high-load region, so that a medium/high load-time cetane number CETH is calculated in a step 8, and then the step 16 is executed, followed by terminating the present process.

Figure 3:
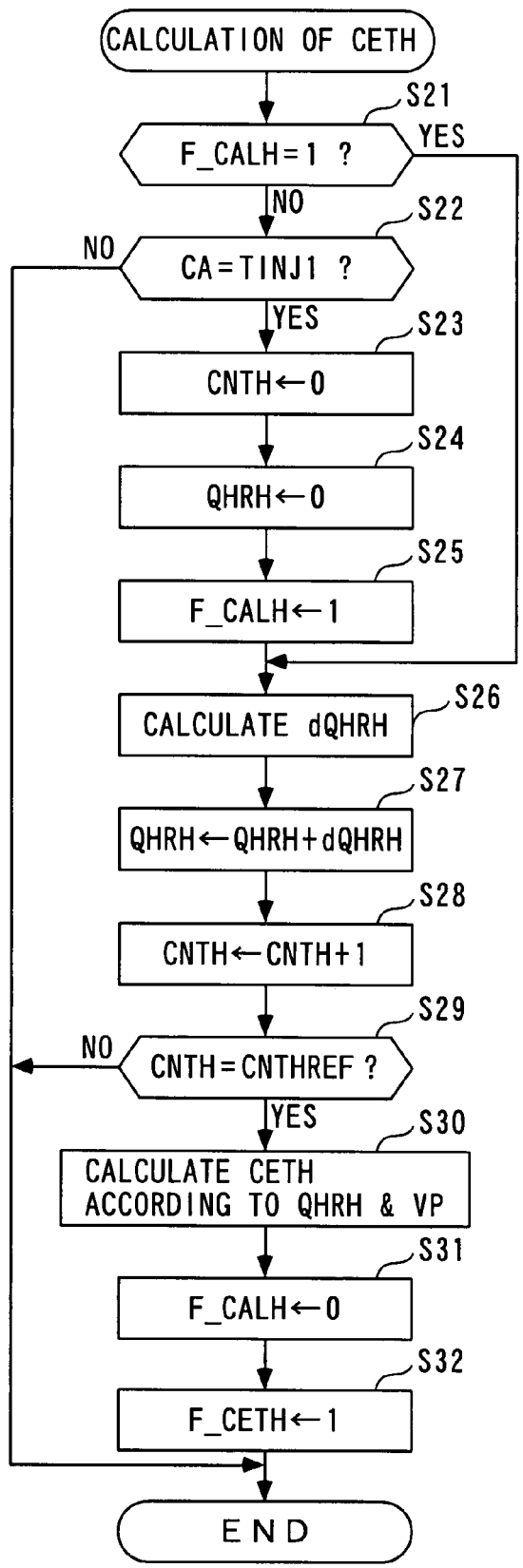
FIG. 3 is a flowchart showing a medium/high load-time cetane number (CETH)-calculating process executed in a step 8 in FIG. 2.
Figure 4:
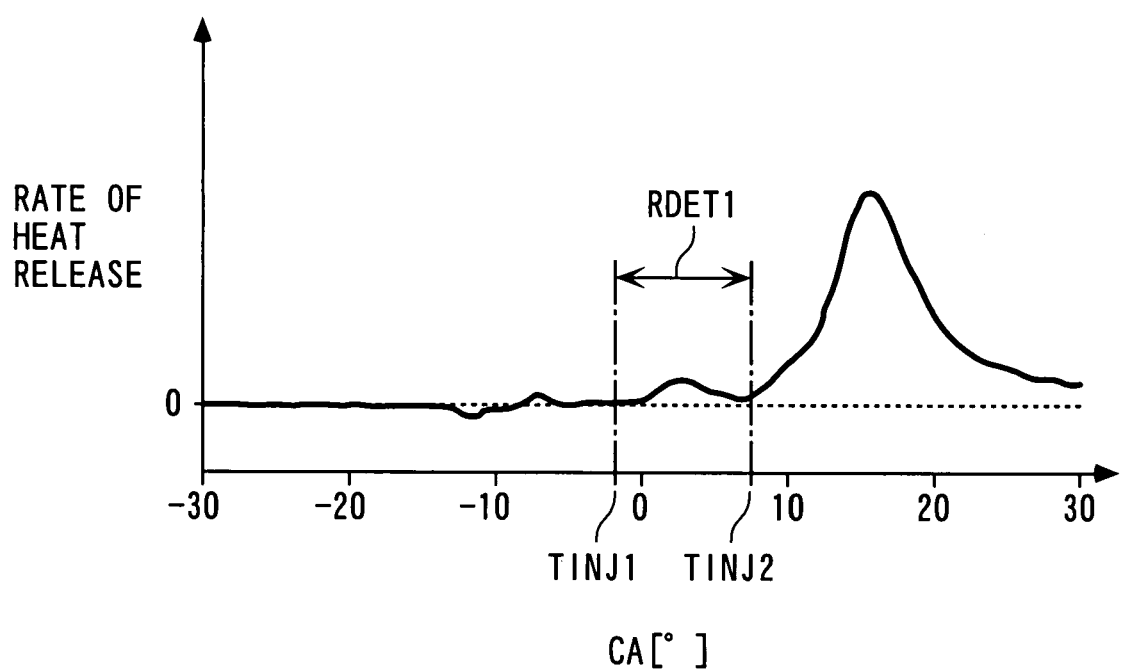
FIG. 4 is a diagram showing the relationship between a crank angle and a heat release rate in a normal combustion mode.

FIG. 3 shows a medium/high load-time cetane number (CETH)-calculating process for calculating the medium/high load-time cetane number CETH (property of fuel). In the present process, the amount of heat release caused by pilot injection is calculated during a predetermined calculation section RDET1 defined by pilot injection start timing TINJ1 and calculation end timing TINJ2, illustrated in FIG. 4, and the medium/high load-time cetane number CETH is calculated based on the calculated amount of heat release. The present process is executed in synchronism with generation of the TDC signal pulse whenever the crankshaft rotates through a crank angle of 1°.

In the present process, first, it is determined in a step 21 whether or not a calculation in-progress flag F_CALH is equal to 1 (step 21). If the answer to the question is negative (NO), i.e. if the medium/high load-time cetane number CETH is not being calculated, it is determined whether or not the present value of the crank angle CA is equal to the pilot injection start timing (hereinafter referred to as "the injection start timing") TINJ1 (step 22). If the answer to the question is negative (NO), the present process is immediately terminated.

On the other hand, if the answer to the question of the step 22 is affirmative (YES), it is determined that calculation of the medium/high load-time cetane number CETH is to be started, and a calculation counter CNTH and a heat release amount QHRH, referred to hereinafter, are both reset to 0 (steps 23 and 24). Then, the calculation in-progress flag F_CALH is set to 1 (step 25), and then the process proceeds to a step 26. As a consequence, in the following loops, the answer to the question of the step 21 becomes affirmative (YES), so that in this case, the steps 22 to 25 are skipped and the process directly proceeds to the step 26.

In the step 26, a heat release rate dQHRH (heat release amount per unit crank angle) is calculated by the following equation (1):

$$dQHRH = k/(k-1) \times P\theta \times 1000 \times dV\theta + 1/(k-1) \times DP \times 1000 \times V\theta \quad (1)$$

wherein
dQHRH: heat release rate (J/deg)
k: specific-heat ratio of mixture
P$\theta$: absolute value (kPa) of in-cylinder pressure
dV$\theta$: cylinder volume rise rate (m$^3$/deg)
V$\theta$: cylinder volume (m$^3$)
DP: amount of change in in-cylinder pressure (kPa/deg)

The specific-heat ratio k is set to a predetermined value (e.g. 1.39). Each of P$\theta$, dV, and V$\theta$ represents a value determined according to the crank angle position, and DP represents a value of the in-cylinder pressure change amount detected by the in-cylinder pressure sensor 21.

Then, the calculated heat release rate dQHRH is added to the immediately preceding value of the heat release amount QHRH, whereby the heat release amount QHRH as the total amount of heat which has been released or generated during a time period from the injection start timing TINJ1 to the present loop is calculated (step 27). Next, the calculation counter CNTH is incremented (step 28), and it is determined whether or not the count of the calculation counter CNTH has reached a predetermined value CNTHREF (step 29). The predetermined value CNTHREF is set to a value (e.g. 10) corresponding to the length of the calculation section RDET1. Therefore, if the answer to the question of the step S29 is negative (NO), the present process is immediately terminated, whereas if the answer to the question is affirmative (YES), it is judged that the calculation section RDET1 has come to the end, so that the medium/high load-time cetane number CETH is calculated by searching a CETH map shown in FIG. 5, according to the heat release amount QHRH calculated in the step 27 and the vehicle speed VP (step 30).

In the CETH map, there are provided two tables, one for the second predetermined vehicle speed VP2 and the other for a third predetermined vehicle speed VP3 (e.g. 100 km/h) which is higher than the second predetermined vehicle speed VP2. Each of the tables is set such that as the heat release amount QHRH is larger, the cetane number CETH becomes larger. This is because as the cetane number is larger, fuel burns more easily, which increases the amount of heat release within a predetermined time period, by combustion of fuel injected by pilot injection. Further, as is apparent from a comparison between the two tables, in the table for the third predetermined vehicle speed VP3 which is higher than the second predetermined vehicle speed VP2, the medium/high load-time cetane number CETH is set to a smaller value with respect to an identical value of the heat release amount QHRH than in the table for the second predetermined vehicle speed VP2. This is because assuming that the cetane number is the same, the higher the vehicle speed VP, i.e. the higher the load, the larger the heat release amount. It should be noted that when the vehicle speed VP is not equal to either the second predetermined vehicle speed VP2 or the third predetermined vehicle speed VP3, the medium/high load-time cetane number CETH is determined by interpolation.

Referring again to FIG. 3, in a step 31 following the step 30, the calculation in-progress flag F_CALH is reset to 0, and then the medium/high load-time cetane number calculation completion flag F_CETH is set to 1 (step 32) so as to indicate that calculation of the medium/high load-time cetane number CETH has been completed, followed by terminating the present process.

Referring again to FIG. 2, if the answer to the question of the step 7 is negative (NO), i.e. if VP1$\leq$VP$\leq$VP2 holds, it is judged that the engine 3 is in a low-load region, and it is determined whether or not the medium/high load-time cetane number calculation completion flag F_CETH and the low load-time cetane number calculation completion flag F_CETL are both equal to 1 (steps 9 and 10). If the answer to either of these questions is affirmative (YES), i.e. if calculation of the medium/high load-time cetane number CETH or the low load-time cetane number CETL has been completed, the step 16 is executed, followed by terminating the present process.

On the other hand, if the answers to the questions of the respective steps 9 and 10 are both negative (NO), the EGR control valve 7b is caused to be operated in the valve closing direction to reduce the EGR amount such that the EGR amount becomes equal to a predetermined EGR amount QEGR for a cetane number calculation time (step 11). The EGR amount QEGR for the cetane number calculation time is set to a predetermined ratio (e.g. 80%) with respect to a normal EGR amount.

Then, it is determined whether or not a predetermined time period (e.g. 5 to 10 sec) has elapsed after execution of control for reducing the EGR amount (step 12). If the answer to the question is negative (NO), the process proceeds to the step 16, whereas if the answer to the question is affirmative (YES), it is judged that the EGR amount has converged to the EGR amount QEGR for the cetane number calculation time, and the low load-time cetane number CETL is calculated in a step 13. Then, the step 16 is executed, followed by terminating the present process.

Figure 6:
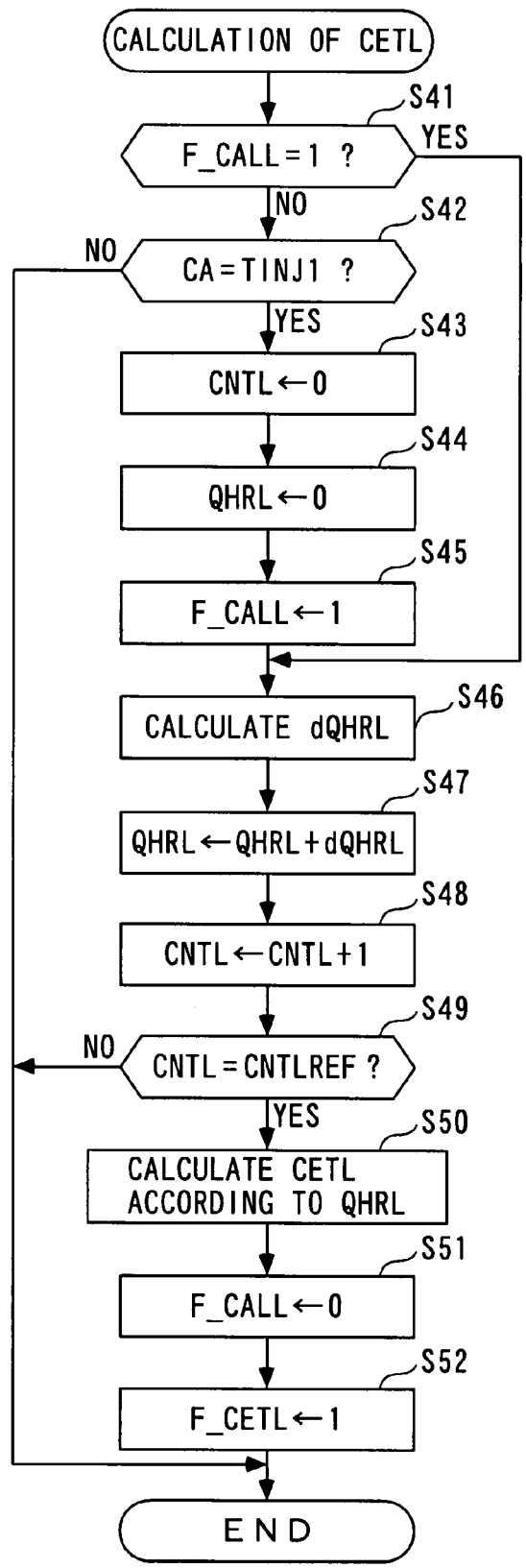
FIG. 6 is a flowchart showing a low load-time cetane number (CETL)-calculating process executed in a step 13 in FIG. 2.

FIG. 6 shows a low load-time cetane number (CETL)-calculating process for calculating the low load-time cetane number CETL (property of fuel). Processing carried out in this process is substantially the same as that in the CETH-calculating process for calculating the medium/high load-time cetane number CETH. In the present process, the low load-time cetane number CETL is calculated based on a heat release amount QHRL by executing steps 41 to 52 similarly to the steps 21 to 32, and when the calculation is completed, the low load-time cetane number calculation completion flag F_CETL is set to 1 (step 52).

Figure 7:
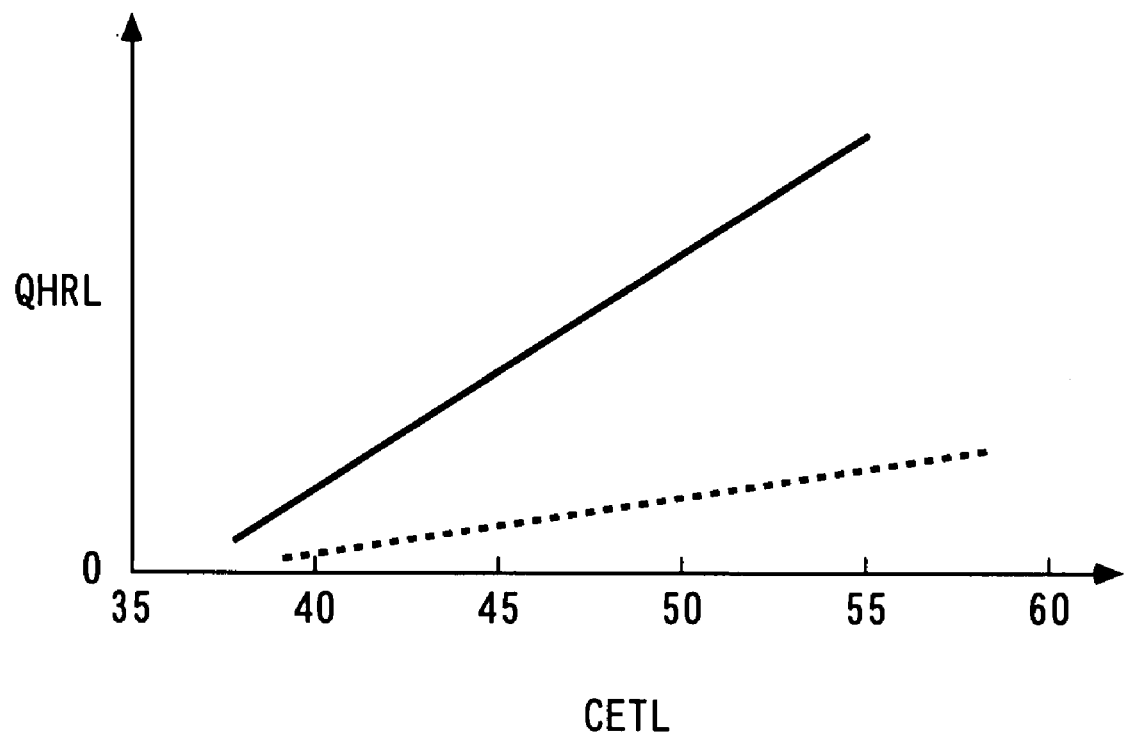
FIG. 7 is a diagram showing an example of a CETL table for use in the FIG. 6 process.

FIG. 7 shows a CETL table for use in calculation of the low load-time cetane number CETL in the step 50 of the present process. This table is set such that as the heat release amount QHRL is larger, the low load-time cetane number CETL becomes smaller. It should be noted that a broken line in FIG. 7 shows, for reference purposes, the relationship between the cetane number and the heat release amount in the case where control for reducing the EGR amount is not performed. More specifically, when the engine 3 is in the low-load region, the heat release amount is inherently small, and therefore the heat release amount changes relatively gently with respect to the cetane number. In the present embodiment, since the control for reducing the EGR amount is performed in the step 11, the proportion of fresh air in intake air drawn into each cylinder becomes larger to increase the amount of heat release within a predetermined time period by combustion of fuel injected by pilot injection, and hence the heat release amount QHRL changes more largely with respect to the low load-time cetane number CETL than when the control for reducing the EGR amount is not performed. The CETL table is configured based on such a relationship between the heat release amount QHRL and the low load-time cetane number CETL.

As described above, in the medium/high-load region of the engine 3 where the vehicle speed VP>the second predetermined vehicle speed VP2 holds, the heat release amount QHRH is calculated according to the in-cylinder pressure change amount DP (steps 26 and 27), and then the medium/high load-time cetane number CETH is calculated according to the calculated heat release amount QHRH and the vehicle speed VP (step 30). Therefore, it is possible to estimate the medium/high load-time cetane number CETH with high accuracy.

Further, in the low-load region of the engine 3 where the first predetermined vehicle speed VP1≦the vehicle speed VP≦the second predetermined vehicle speed VP2 holds, the heat release amount QHRL is calculated according to the in-cylinder pressure change amount DP (steps 46 and 47), and then the low load-time cetane number CETL is calculated according to the calculated amount of heat release QHRL (step 50). In addition, prior to the calculation of the low load-time cetane number CETL, the heat release amount QHRL is increased by reducing the EGR amount (step 11), which makes it possible to increase the difference in the heat release amount QHRL dependent on the difference in cetane number. This makes it possible to calculate the low load-time cetane number CETL based on the heat release amount QHRL more accurately.

Referring again to FIG. 2, if the answer to the question of the step 5 is affirmative (YES), i.e. if the engine 3 is idling, it is determined whether or not the idle-time cetane number calculation completion flag F_CETI is equal to 1 (step 14). If the answer to the question is affirmative (YES), i.e. if the idle-time cetane number CETI has already been calculated, the process proceeds to the step 16. On the other hand, if the answer to the question of the step 14 is negative (NO), the idle-time cetane number CETI is calculated in a step 15, and then the step 16 is executed, followed by terminating the present process.

Figure 8:
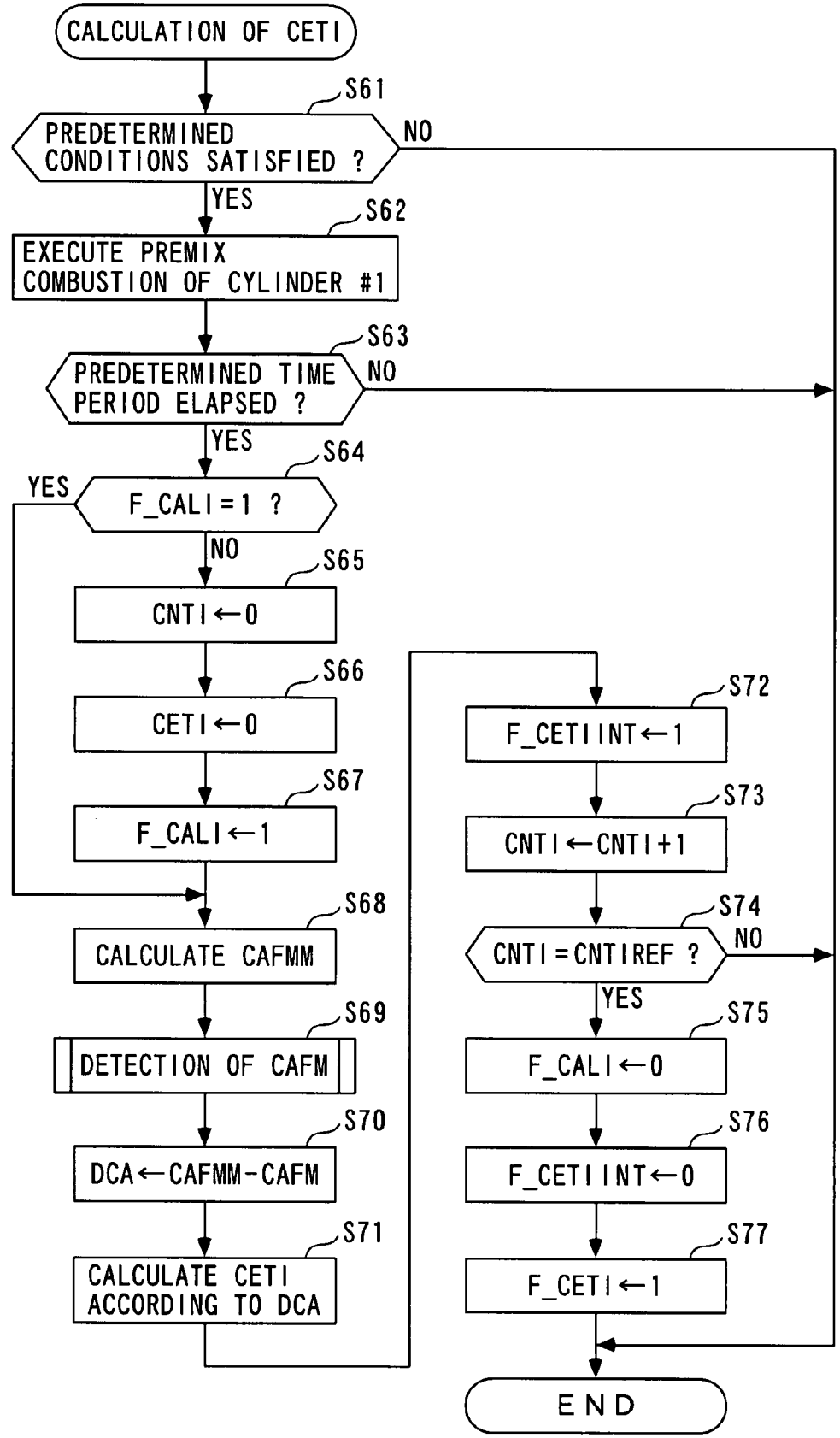
FIG. 8 is a flowchart showing an idle-time cetane number (CETI)-calculating process executed in a step 15 in FIG. 2.

FIG. 8 shows an idle-time cetane number (CETI)-calculating process for calculating the idle-time cetane number CETI. In the present process, the idle-time cetane number CETI is calculated according to the difference between reference ignition timing CAFMM and actual ignition timing CAFM, while performing premix combustion for the cylinder #1. The CETI-calculating process is executed in synchronism with generation of the CRK signal.

First, it is determined in a step 61 whether or not predetermined conditions of operation of the engine 3 are satisfied. The predetermined conditions of operation include, for example, a condition of the exhaust temperature TE being not lower than a predetermined temperature TEREF (e.g. 90° C.), and a condition of the engine coolant temperature TW or the oil temperature TOIL being not lower than a predetermined temperature TUP (e.g. 80° C.) indicative of the warmed-up state of the engine 3.

If the answer to the question of the step 61 is negative (NO), it is judged that conditions for executing the calculation of the idle-time cetane number CETI are not satisfied, and the present process is immediately terminated, whereas if the answer to the question is affirmative (YES), premix combustion is performed in the cylinder #1. Specifically, the pilot injection for the cylinder #1 is stopped, and a fuel injection amount QINJ#1 for the main injection is set to a predetermined fixed value QREF which is smaller than for normal combustion. Then, the injection start timing TINJ1 is set to a more advanced value than for normal combustion, whereby so-called premix combustion in which fuel is burned with delay after fuel injection is performed in the cylinder #1.

Then, it is determined whether or not a predetermined time period has elapsed after execution of the step 62 (step 63). If the answer to this question is negative (NO), the present process is immediately terminated, whereas if affirmative (YES), it is judged that a state of the premix combustion in the cylinder #1 has been stabilized, so that it is determined whether or not a calculation in-progress flag F_CALI is equal to 1 (step 64). If the answer to this question is negative (NO), it is judged that calculation of the idle-time cetane number CETI is to be started, and a calculation counter CNTI and the idle-time cetane number CETI are both reset to 0 (steps 65 and 66). Then, the calculation in-progress flag F_CALI is set to 1 (step 67), and the process proceeds to a step 68. After execution of the step 67, the answer to the question of the step 64 becomes affirmative (YES) in the following loops, so that in this case, the steps 65 to 67 are skipped and the process directly proceeds to the step 68.

In the step 68, the reference ignition timing CAFMM is calculated by searching a CAFMM map (not shown) according to the engine speed NE and a demanded torque PMCMD. The demanded torque PMCMD is calculated by searching a map (not shown) according to the engine speed NE and the accelerator pedal opening AP.

In the CAFMM map, ignition timing obtained when fuel of a predetermined cetane number (e.g. 57) is burned by premix combustion is set to reference ignition timing CAFMM according to the engine speed NE and the demanded torque PMCMD. The reference ignition timing CAFMM is represented by a crank angle position.

Figure 9:
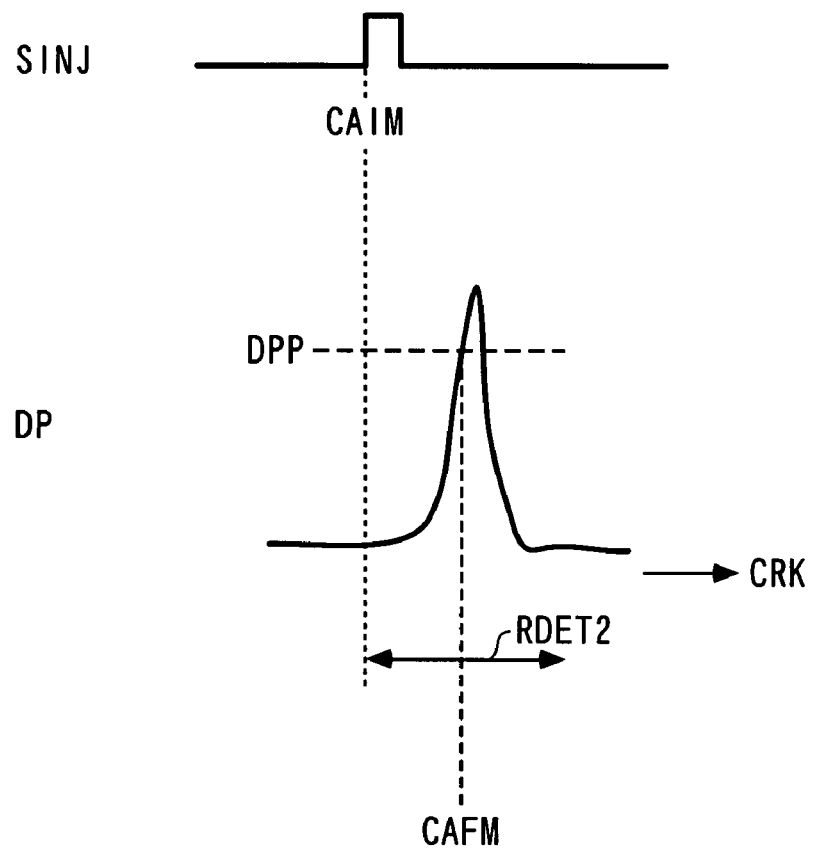
FIG. 9 is a diagram useful in explaining how to detect an actual ignition timing CAFM.

Then, an actual ignition timing CAFM in the cylinder #1 is detected (step 69). The detection of the actual ignition timing CAFM is performed as shown in FIG. 9 by way of example. More specifically, the injection pulse signal SINJ associated with the injector 4 is output at a crank angle position CAIM, and then a crank angle position which the piston takes when the in-cylinder pressure change amount DP exceeds a predetermined threshold value DPP is detected as the actual ignition timing CAFM. It should be noted that the detection of the actual ignition timing CAFM is performed while the rotation of the crankshaft is within a predetermined angular range DET2 (e.g. 10°) after output of the injection pulse signal SINJ.

Figure 10:
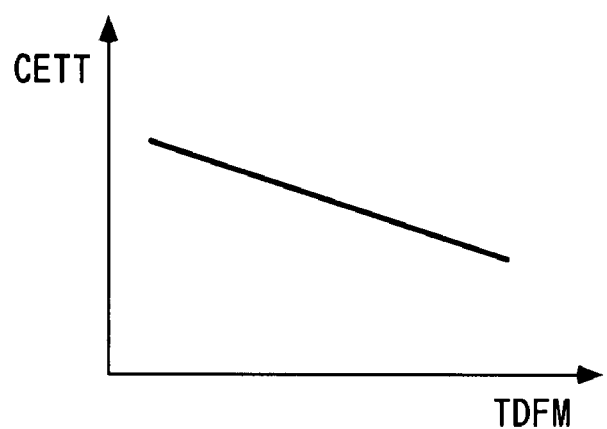
FIG. 10 is a diagram showing an example of a CRTT table for use in the FIG. 8 process.

Then, an ignition delay angle DCA is calculated by subtracting the actual ignition timing CAFM from the reference ignition timing CAFMM determined as described above (step 70). Thereafter, the idle-time cetane number CETI is calculated according to the calculated ignition delay angle DCA (step 71), followed by terminating the present process. Specifically, first, the ignition delay angle DCA is converted to an ignition delay time TDFM using the current engine speed NE, and then, the idle-time cetane number CETI is calculated by searching a CETT table shown in FIG. 10, according to the ignition delay time TDFM. In the CETT table, a provisional value CETT of the cetane number is set to a smaller value as the ignition delay time TDFM is larger. Next, the current idle-time cetane number CETI is calculated by weighted averaging of the calculated provisional value CETT and the immediately preceding value of the cetane number CETI(n−1).

Then, the idle-time cetane number provisional calculation flag F_CETIINT is set to 1 so as to indicate that the idle-time cetane number CETI is being calculated (step 72). Thereafter, the calculation counter CNTI is incremented (step 73), and then it is determined whether or not the count of the calculation counter CNTI has reached a predetermined value CNTIREF (e.g. 10) (step 74). If the answer to the question is negative (NO), the present process is immediately terminated, whereas if the answer to the question is affirmative (YES), the calculation in-progress flag F_CALI and the idle-time cetane number provisional calculation flag F_CETIINT are both reset to 0 (steps 75 and 76), and then the idle-time cetane number calculation completion flag F_CETI is set to 1 so as to indicate that calculation of the idle-time cetane number CETI has been completed (step 77), followed by terminating the present process.

As described above, during calculation of the idle-time cetane number CETI, premix combustion is performed in the cylinder #1. During the premix combustion, the difference in ignition timing due to a difference in the cetane number CET of fuel is increased, which makes it possible to calculate the idle-time cetane number CETI based on ignition delay with high accuracy.

Referring again to FIG. 2, in the step 16 following the step 8, 13, or 15, the cetane number CET is determined, followed by terminating the present process. The determination of the cetane number CET is performed in the following manner: If none of the idle-time cetane number CETI, the low load-time cetane number CETL, and the medium/high load-time cetane number CETH have been calculated yet, the cetane number CET is held at the provisional cetane number CETBASE set in the step 3. On the other hand, any of the three types of cetane numbers CETI, CETL, and CETH has been calculated, the cetane number CET is set to one whose calculation has been completed.

Further, of the three types of cetane numbers CETI, CETL and CETH, if a plurality of them have been calculated, the cetane number CET is set to one which is higher in reliability. For example, since the low load-time cetane number CETL is calculated while carrying out the control for reducing the EGR amount, it is judged that the low load-time cetane number CETL is relatively lower in reliability, and therefore, the idle-time cetane number CETI or the medium/high-load cetane number CETH is preferentially employed. The cetane number CET thus calculated is used for control of the fuel injection amount QINJ and the fuel injection timing TINJ.

Figure 11:
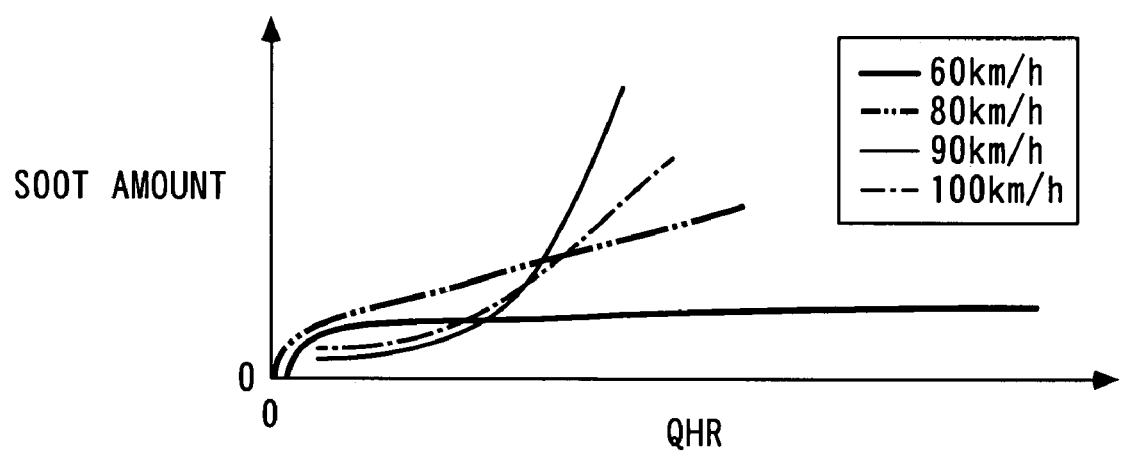
FIG. 11 is a diagram showing the relationship between a heat release amount QHR and a soot amount dependent on a vehicle speed VP.
Figure 12:
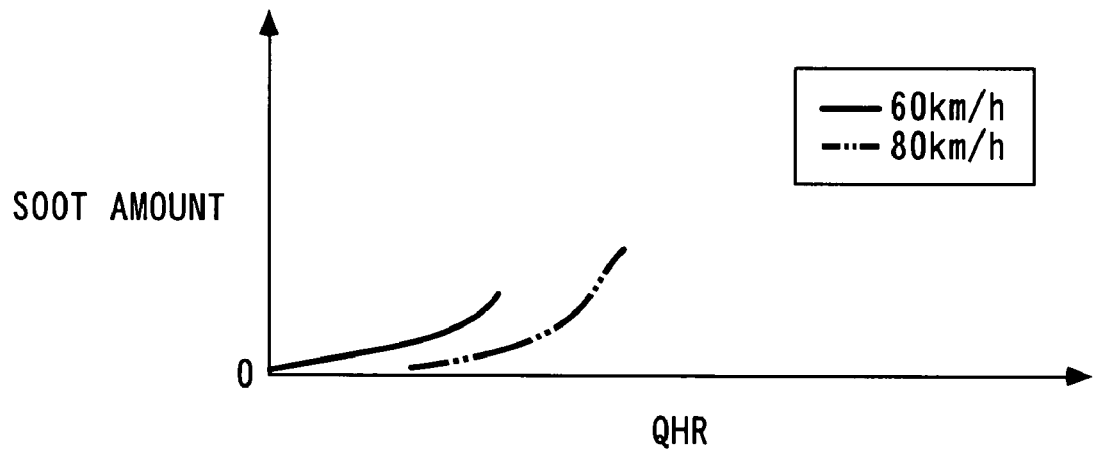
FIG. 12 a diagram showing the relationship between the heat release amount QHR and the soot amount dependent on the vehicle speed VP when an EGR amount is reduced.

FIGS. 11 and 12 show an empirically determined relationship between the amount of soot emitted from the engine 3 as a result of combustion caused by pilot injection (hereinafter referred to as "pilot combustion"), the heat release amount QHR, and the vehicle speed VP. FIG. 11 shows a case in which the pilot combustion is performed without reducing the EGR amount. When the vehicle velocity VP is higher than 80 km/h, the amount of soot relatively steeply increases with an increase in the heat release amount QHR. Therefore, according to the heat release amount QHR, and by extension to the in-cylinder pressure change amount DP, it is possible to estimate the cetane number CET and the soot amount with accuracy. On the other hand, when the vehicle speed VP is not higher than 80 km/h, the correlation between the heat release amount QHR and the soot amount is small, and hence even if the heat release amount QHR increases, the amount of increase in the soot amount is slight, which makes it difficult to accurately estimate the soot amount according to the in-cylinder pressure change amount DP.

FIG. 12 shows the relationship between the soot amount and the heat release amount QHR exhibited when the control for reducing the EGR amount is executed as in the step 11 in FIG. 2, and the heat release amount QHR is increased. In this case, as the proportion of the amount of fresh air increases, and the combustion of the engine becomes closer to a high load-time state, and hence compared with the FIG. 11 case, even when the vehicle speed VP is not higher than 80 km/h, the soot amount relatively steeply increases with an increase in the heat release amount QHR. As a result, it becomes possible to accurately estimate the soot amount according to the in-cylinder pressure change amount DP.

As described above, since the soot amount can be estimated according to the in-cylinder pressure change amount DP, it becomes possible to properly carry out the control of the engine 3 so as to reduce the soot amount, and the regeneration control for the DPF13, including determination of timing of the regeneration processing, according to the estimated soot amount.

Figure 13:
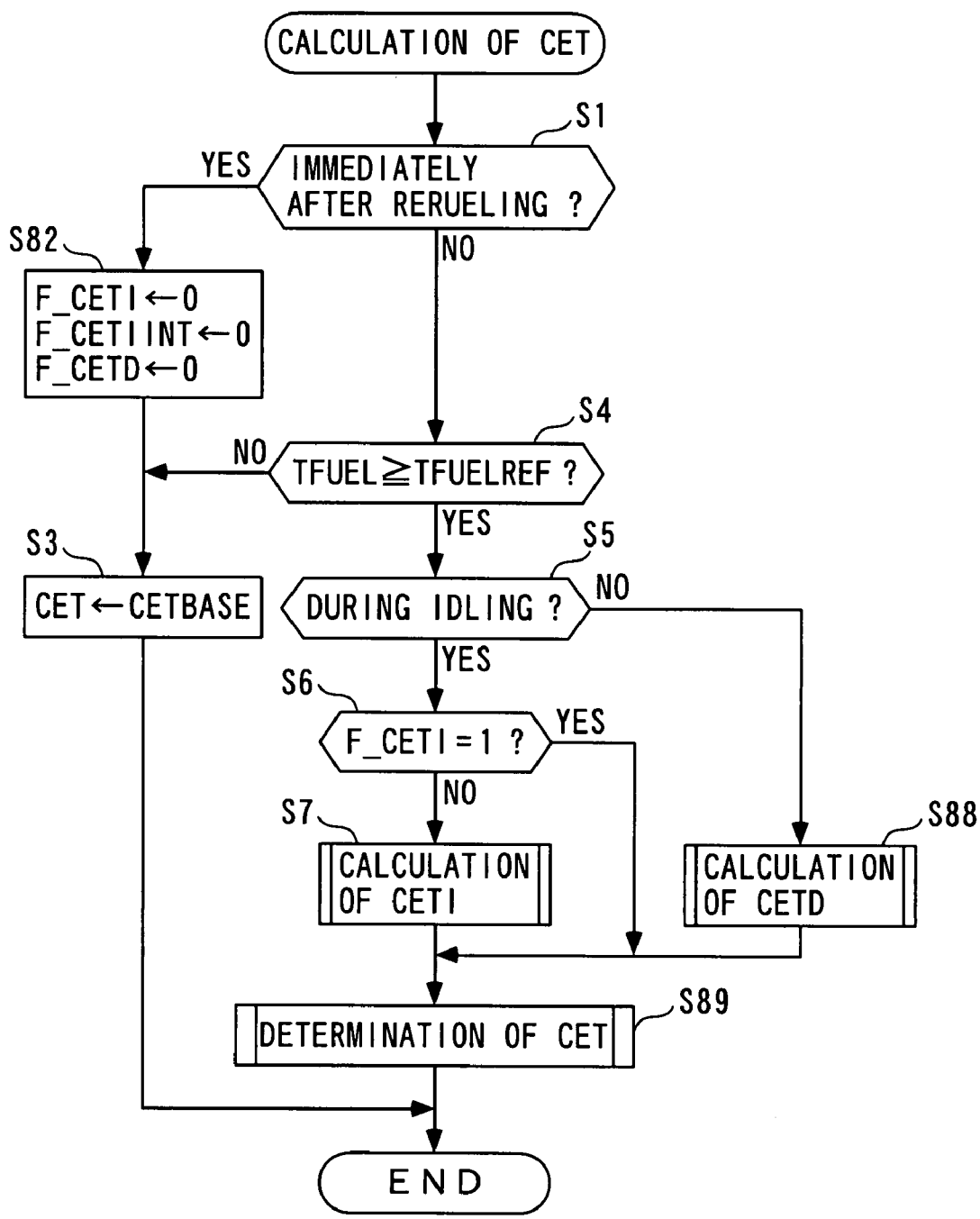
FIG. 13 is a flowchart showing a cetane number (CET)-calculating process executed by a control system according to a second embodiment of the present invention.

FIG. 13 shows a cetane number (CET)-calculating process according to a second embodiment of the present invention. It should be noted in FIG. 13, steps identical to those of the FIG. 2 CET-calculating process according to the first embodiment are designated by the same step numbers. As is clear from comparison with FIG. 2, the present process is basically formed by replacing the steps 6 to 13 of the FIG. 2 CET-calculating process by a step 88. More specifically, in the first embodiment, in the steps 6 to 13, the low load-time cetane number CETL and the medium/high load-time cetane number CETH are calculated, whereas in the present embodiment, in the step 88, a traveling-time cetane number CETD is calculated. To this end, in the step 82 corresponding to the step 2 in FIG. 2, in place of the low load-time cetane number calculation completion flag F_CETL and the medium/high load-time cetane number calculation completion flag F_CETH, a traveling-time cetane number calculation completion flag F_CETD is set to 0.

Figure 14:
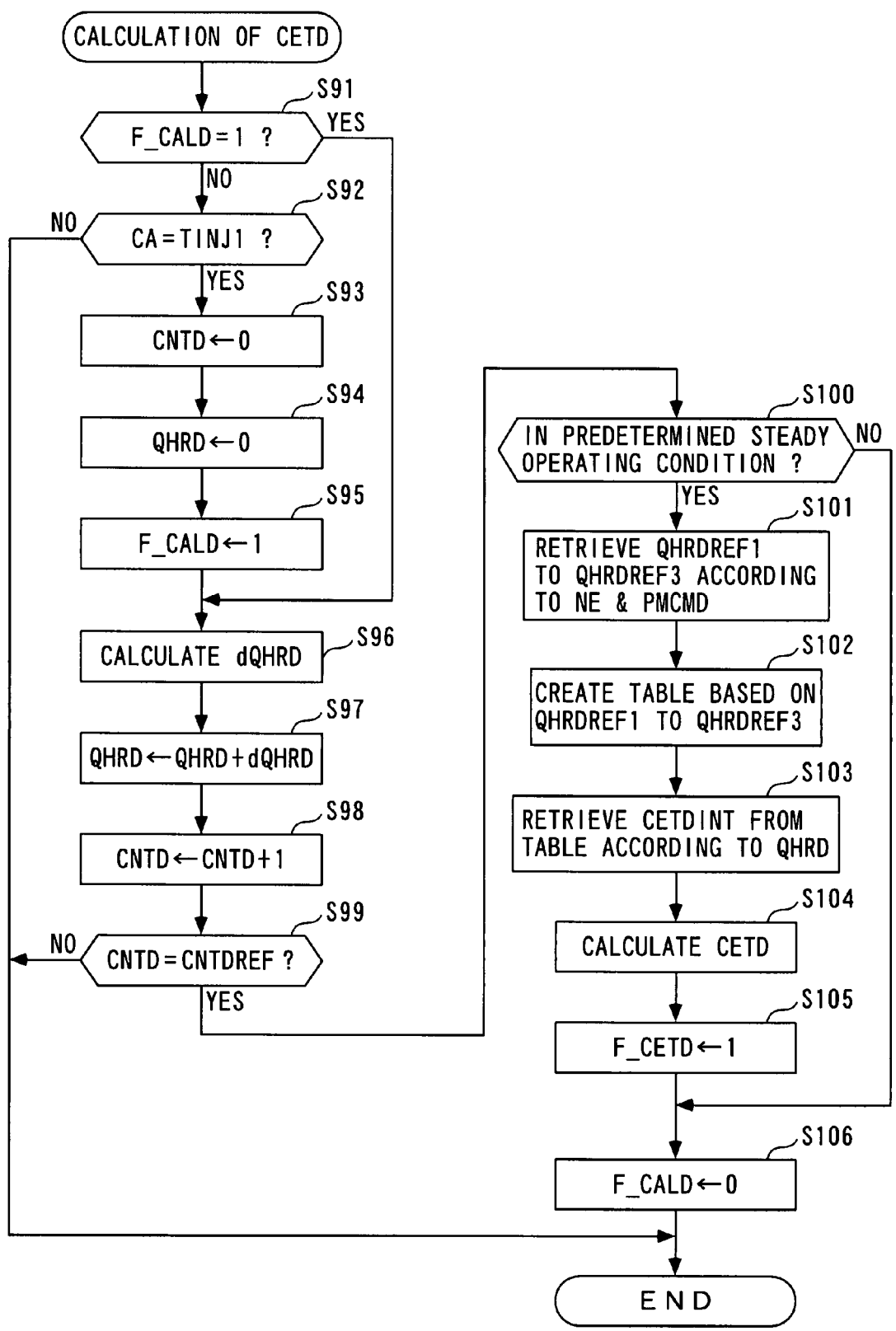
FIG. 14 is a flowchart showing a traveling-time cetane number (CETD)-calculating process executed in the FIG. 13 process.

FIG. 14 shows a traveling-time cetane number (CETD)-calculating process executed in the step 88 for calculating the traveling-time cetane number CETD (property of fuel). The present process is executed in synchronism with generation of the TDC signal pulse whenever the crankshaft rotates through a crank angle of 1°.

In the present process, first, steps 91 to 99 are executed similarly to the steps 21 to 29 of the process described with reference to FIG. 3, so as to calculate the heat release amount QHRD in the calculation section RDET1. Then, it is determined whether or not the engine 3 is in a predetermined steady operating condition (step 100). Specifically, when the vehicle speed VP, the engine speed NE, the demanded torque PMCMD, the accelerator pedal opening AP, the difference between an actual boost pressure and a target boost pressure, and the difference between an actual fresh air amount and a target fresh air amount are all within respective predetermined ranges, it is determined that the engine 3 is in the predetermined steady operating condition.

If the answer to the question of the step 120 is affirmative (YES), reference heat release amounts QHRDREF1 to QHRDREF3 are retrieved from respective three heat release amount maps shown in FIG. 15, according to the engine speed NE and the demanded torque PMCMD (step 101). These heat release amount maps are formed by empirically determining in advance values of the amount of heat release occurring in a single cylinder within a predetermined section corresponding to the calculation section RDET1 when the engine is operated using each of fuels having respective predetermined first to third cetane numbers CET1 to CET3 (e.g. 46, 50, and 55), and mapping the thus determined values of the heat release amount according to the engine speed NE and the demanded torque PMCMD, as the reference heat release amounts QHRDREF1 to QHRDREF3. The heat release amount maps are stored in the ROM of the ECU 2.

Figure 16:
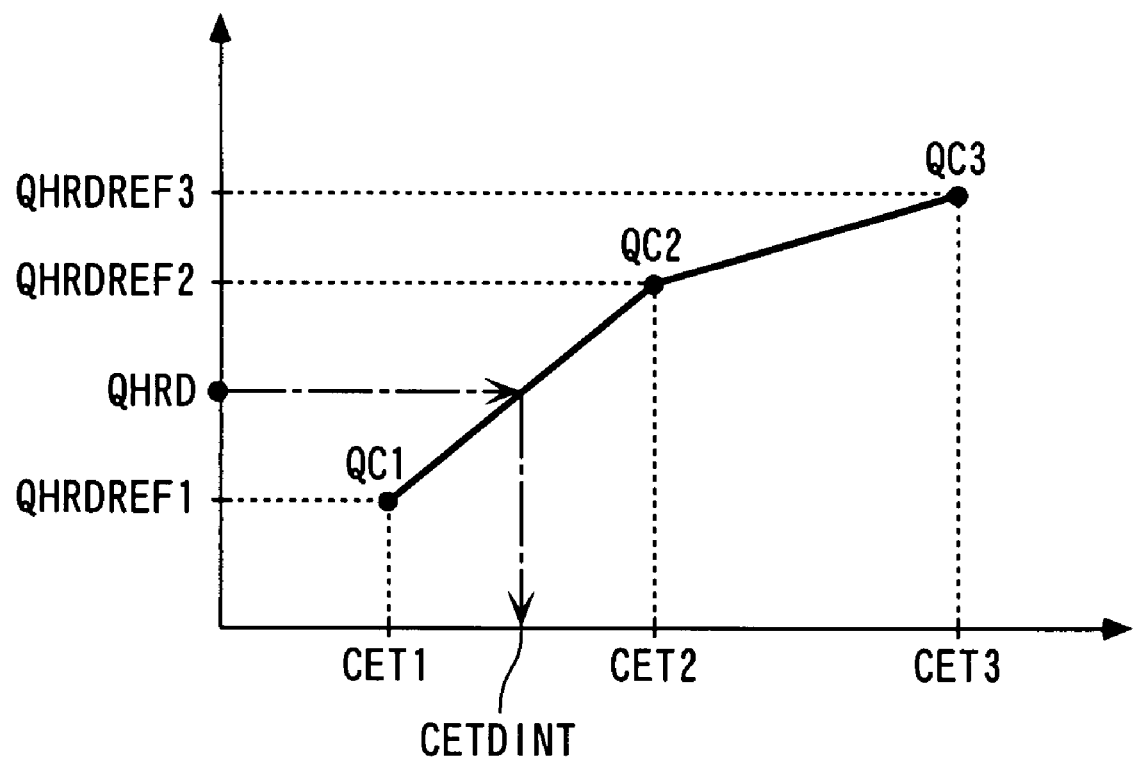
FIG. 16 is a diagram showing an example of a table for use in determining a traveling-time provisional cetane number (CETDINT), which is created in the FIG. 14 process.

Then, a table, shown in FIG. 16, for determining a traveling-time provisional cetane number CETDINT is created from combinations of the reference heat release amounts QHRDREF1 to QHRDREF3 retrieved as above and first to third cetane numbers associated with the respective reference heat release amounts (step 102). Specifically, three points (QC1 to QC3) determined by combining the first to third cetane numbers and the reference heat release amounts QHRDREF1 to QHRDREF3, respectively, are plotted on a table, as shown in FIG. 16, whereby the table which shows the relationship between the heat release amount QHRD and the traveling-time provisional cetane number CETDINT is created.

Next, the traveling-time provisional cetane number CETDINT is calculated by searching the table created as shown in FIG. 16, according to the heat release amount QHRD calculated in the step 97 (step 103). It should be noted that when the heat release amount QHRD is not equal to the reference heat release amounts QHRDREF1 to QHRDREF3, the traveling-time provisional cetane number CETDINT is determined by interpolation.

Then, the traveling-time cetane number CETD is calculated by carrying out filtering on the traveling-time provisional cetane number CETDINT (step 104). Specifically, the traveling-time cetane number CETD is calculated by the following equation (2):

$$CETD = K \cdot CETDINT + (1-K) \cdot CETD(n-1) \quad (2)$$

wherein K (filter characteristic) represents a predetermined weighting coefficient of less than 1.0. As is apparent from the equation (2), the traveling-time cetane number CETD is calculated by weighted averaging of the traveling-time provisional cetane number CETDINT determined in the current loop and the immediately preceding value CETD (n−1) of the traveling-time cetane number, using the weighting coefficient K.

Next, the traveling-time cetane number calculation completion flag F_CETD is set to 1 (step 105), and then a calculation in-progress flag F_CALD is reset to 0 (step 106), followed by terminating the present process. On the other hand, if the answer to the question of the step 100 is negative (NO), i.e. if the engine 3 is not in the predetermined steady operating condition, the step 106 is executed, followed by terminating the present process.

Referring again to FIG. 13, in a step 89, the cetane number CET is determined, depending on the idle-time cetane number CETI determined in the step 7, the traveling-time cetane number CDTD determined in the step 88, etc., followed by terminating the present process. The determination of the cetane number CET is carried out basically similarly to the step 16 in FIG. 2. In particular, when the calculation of both of the idle-time cetane number and the traveling-time cetane number CETD has been completed, the cetane number CET is set to the former of the two. This is because during idling of the engine 3, the combustion is stable, and hence it is judged that the idle-time cetane number CETI calculated at the time is higher in reliability.

As described above, according to the present embodiment, reference heat release amounts QHRDREF1 to QHRDREF3 corresponding to the first to third cetane numbers CET1 to CET3 are stored in advance in association with the engine speed NE and the demanded torque PMCMD. Then, a table is created from the first to third cetane numbers CET1 to CET3, and the three reference heat release amounts QHRDREF1 to QHRDREF3 determined in association with the detected actual engine speed NE and demanded torque PMCMD, and using the created table, the traveling-time cetane number CETD is calculated according to the heat release amount QHRD calculated according to the actual pressure change amount DP. Therefore, under various operating conditions of the engine 3, the traveling-time cetane number CETD can be more accurately estimated.

Further, by performing filtering of the traveling-time provisional cetane number CETDINT determined according to the engine speed NE and the demanded torque PMCMD by weighted averaging, it is possible to suppress influence due to noise and accurately estimate the traveling-time cetane number CETD. Further, since the traveling-time cetane number CETD is estimated on condition that the engine 3 is in a predetermined steady operating condition, the heat release amount QHRD can be properly estimated while suppressing influence due to a change in the operating condition, and hence the traveling-time cetane number CETD can be more accurately estimated according to the heat release amount QHRD.

Further, according to the two kinds of parameters indicative of load on the engine 3, i.e. the engine speed NE and the demanded torque PMCMD, the reference heat release amounts QHRDREF1 to QHRDREF3 are retrieved, and therefore, it is possible to calculate more appropriate values of the reference heat release amounts QHRDREF1 to QHRDREF3 than when the number of kinds of parameters indicative of load on the engine is only one, which makes it possible to further increase the reliability of the traveling-time cetane number CETD.

Figure 17:
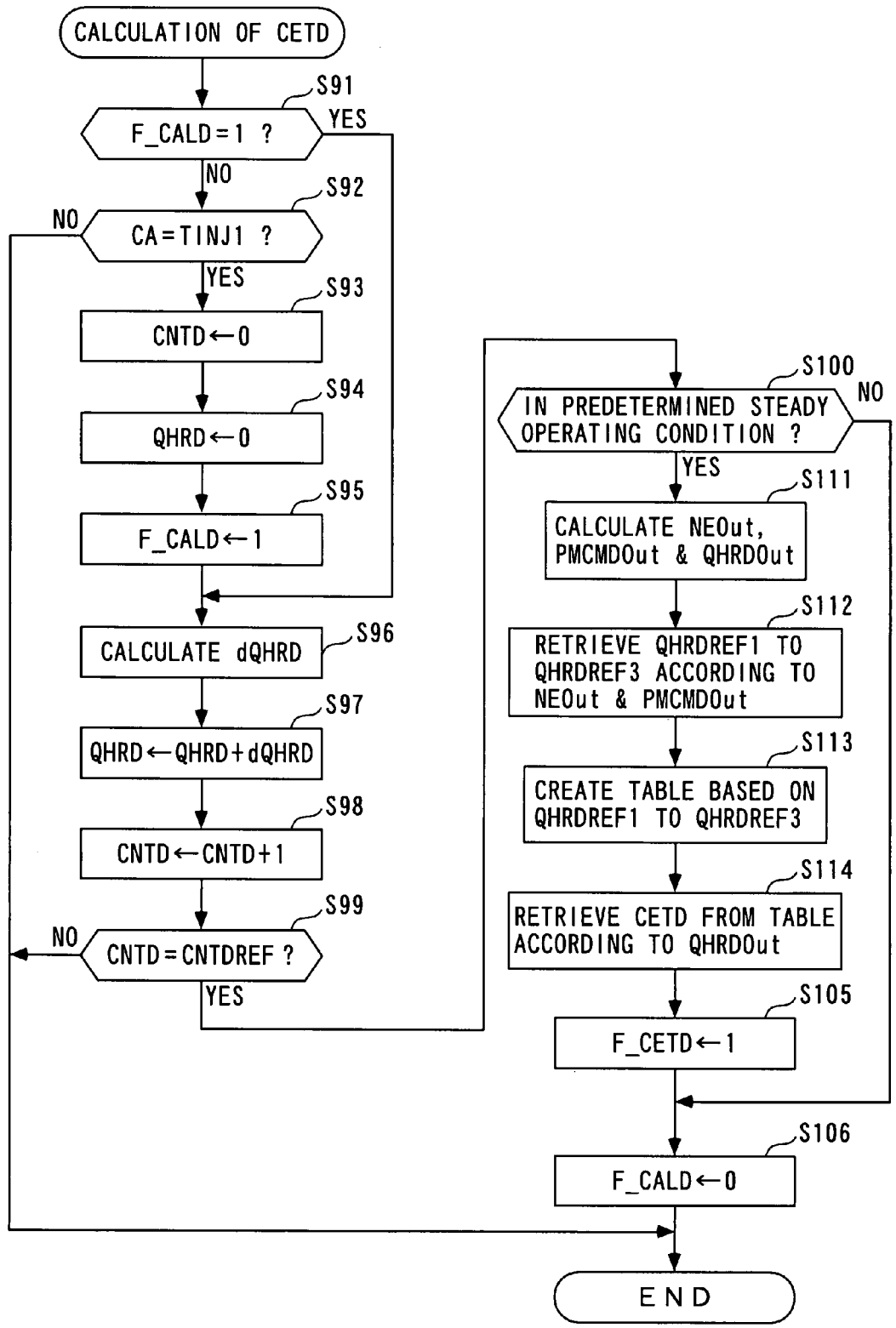
FIG. 17 is a flowchart showing a variation of the FIG. 14 traveling-time cetane number (CETD)-calculating.

FIG. 17 shows a variation of the FIG. 14 CETD calculation process. In FIG. 17, steps identical to those of the FIG. 14 CETD-calculating process are designated by the same step numbers. In this variation, the steps 101 to 104 in FIG. 14 are replaced by steps 111 to 114.

First, in a step 111, respective filtered values NEOut, PMCMDOut, and QHRDOut of the engine speed NE, the demanded torque PMCMD, and the heat release amount QHRD are calculated. More specifically, a weighted average value of the present value and the immediately preceding value of each of them is calculated as a filtered value using the same weighting coefficient K, similarly to the step 104.

Then, similarly to the steps 101 and 102, according to the calculated filtered value NEOut and PMCMDOut, the reference heat release amounts QHRDREF1 to QHRDREF3 corresponding to the first to third cetane numbers CET1 to CET3 are retrieved from the FIG. 15 heat release amount map (step 112), and a table is created from these amounts (step 113). Next, by searching the created table according to the filtered value QHRDOut of the heat release amount QHRD calculated in the step 111, the traveling-time cetane number CETD is calculated (step 114). Then, the steps 105 and 106 are carried out, followed by terminating the present process.

As described heretofore, according to the present process, filtering is carried out on the detected engine speed NE and the demanded torque PMCMD by weighted averaging, and according to the thus obtained filtered values NEOut and PMCDOut, the reference heat release amounts QHRDREF1 to QHRDREF3 are retrieved. This suppresses influence of e.g. noise contained in the detected value of the engine speed NE, so that the reference heat release amounts QHRDREF1 to QHRDREF3 can be more properly calculated, and hence based on them, the traveling-time cetane number CETD can be accurately estimated.

Further, weighted averaging of the engine speed NE and the demanded torque PMCMD is carried out using the same weighting coefficient K, and hence influences of respective noises of the engine speed NE and the demanded torque PMCMD can be suppressed to the same degree. This makes it possible to calculate the reference heat release amounts QHRDREF1 to QHRDREF3 retrieved according to the filtered values NEOut and PMCMDOut can be more properly calculated. As a result, the reliability of the traveling-time cetane number CETD can be further improved.

It should be noted that the present invention is by no means limited to the above-described embodiments, but can be practiced in various forms. For example, although in the embodiments, the detection of the in-cylinder pressure change amount DP for calculation of the cetane number is carried out only as to the cylinder #1, the same may be carried out as to another cylinder or other two or more cylinders. Further, although in the embodiments, the cetane number is calculated according to the amount of heat release caused by pilot injection, it may be calculated according to the amount of heat release caused by main injection.

Further, although in the embodiments, as a property of fuel, the cetane number is estimated, this is not limitative, but the amount of aromatic hydrocarbons contained in fuel may be estimated according to load on the engine and the heat release amount, in the same manner as the embodiments.

Further, although in the first embodiment, as a parameter indicative of load on the engine, the vehicle speed VP is employed, this is not limitative, but another suitable parameter, such as the intake air amount QA, may be used. Further, although in the second embodiment, as parameters indicative of load on the engine, the engine speed NE and the demanded torque PMCMD are used, other suitable parameters may be employed.

Further, although in the second embodiment, as the heat release amount map for retrieving the reference heat release amounts, there are provided three heat release amount maps on a reference cetane number-by-reference cetane number basis, the number of the maps may be increased, whereby a more appropriate table can be created according to a larger number of reference heat release amounts, which makes it possible to further improve the accuracy of the traveling-time cetane number CETD.

Although in the second embodiment, the filtering of the engine speed NE etc. is carried out by weighted averaging, mechanical filtering may be carried out instead. Further, although a predetermined value is used as the weighting coefficient K for use in the weighted averaging, the weighting coefficient K may be changed depending on an operating condition of the engine 3.

Further, the method of calculation of the heat release amount is not limited to that shown in the above-described embodiments, but the calculation of the heat release amount may be carried out by a desired method. Moreover, the present invention can be applied to various types of engines, including ship propulsion engines, such as an outboard motor.

It is further understood by those skilled in the art that the foregoing is a preferred embodiment of the invention; and that various changes and modifications may be made without departing from the spirit and scope thereof.

What is claimed is:

1. A control system for an internal combustion engine, comprising:
    pressure change amount-detecting means for detecting an amount of change in pressure within a cylinder of the engine as a pressure change amount;
    heat release amount-calculating means for calculating an amount of heat released in the cylinder as a heat release amount, according to the detected pressure change amount;
    load detecting means for detecting load on the engine; and
    fuel property-estimating means for estimating a property of fuel, based on the calculated heat release amount and the detected load on the engine.

2. A control system as claimed in claim 1, further comprising:
    exhaust gas-recirculating means for recirculating part of exhaust gases exhausted from the cylinder to the cylinder; and
    exhaust gas recirculation amount-reducing means for reducing an amount of exhaust gases recirculated to the cylinder, according to the load on the engine, when said fuel property-estimating means estimates the property of fuel.

3. A control system as claimed in claim 1, further comprising heat release amount-storing means for storing amounts of heat released by combustion of fuels having respective predetermined properties different from each other, on a predetermined property-by-predetermined property basis, according to the load on the engine, as reference heat release amounts, in advance, and
    wherein said fuel property-estimating means estimates the property of fuel based on the reference heat release amounts associated with the respective predetermined properties retrieved from said heat release amount-storing means according to the detected load on the engine, and the heat release amount calculated by said heat release amount-calculating means.

4. A control system as claimed in claim 3, wherein said fuel property-estimating means has provisional determination means for provisionally determining the property of fuel according to the retrieved reference heat release amounts associated with the respective predetermined properties and the calculated heat release amount, and estimates the property of fuel by subjecting the provisionally determined property of fuel to a filtering process.

5. A control system as claimed in claim 3, wherein said fuel property-estimating means subjects the detected load on the engine to a filtering process, and retrieves the reference heat release amounts according to the load on the engine subjected to the filtering process.

6. A control system as claimed in claim 5, wherein said load detecting means detects a plurality of kinds of loads different from each other, and
wherein said fuel property-estimating means subjects the detected different kinds of loads to respective filtering processes having the same filter characteristic.

7. A control system for an internal combustion engine, comprising:
pressure change amount-detecting means for detecting an amount of change in pressure within a cylinder of the engine as a pressure change amount;
heat release amount-calculating means for calculating an amount of heat released in the cylinder as a heat release amount, according to the detected pressure change amount;
load detecting means for detecting load on the engine; and
cetane number-estimating means for estimating a cetane number of fuel, based on the calculated heat release amount and the detected load on the engine.

8. A control system for an internal combustion engine that sequentially performs a pilot injection and a main injection to thereby inject fuel into a cylinder, comprising:
pressure change amount-detecting means for detecting an amount of change in pressure within a cylinder of the engine caused by combustion of fuel injected by the pilot injection, as a pressure change amount;
heat release amount-calculating means for calculating an amount of heat released in the cylinder as a heat release amount, according to the detected pressure change amount;
load detecting means for detecting load on the engine; and
fuel property-estimating means for estimating a property of fuel, based on the calculated heat release amount and the detected load on the engine.

\* \* \* \* \*